United States Patent
Wilson et al.

(10) Patent No.: US 8,678,530 B2
(45) Date of Patent: Mar. 25, 2014

(54) FOAM MANIFOLD FOR INJECTION MOLDING CONSUMER APPLIANCE CASE, FOAMED-IN CASE, AND RELATED METHOD

(75) Inventors: Mark Wayne Wilson, Simpsonville, KY (US); Cory J. Tafoya, Louisville, KY (US); Matthew Keith Sease, Charlestown, IN (US)

(73) Assignee: General Electric Company, Schenectady, NY (US)

( * ) Notice: Subject to any disclaimer, the term of this patent is extended or adjusted under 35 U.S.C. 154(b) by 331 days.

(21) Appl. No.: 13/093,175

(22) Filed: Apr. 25, 2011

(65) Prior Publication Data

US 2012/0266962 A1 Oct. 25, 2012

(51) Int. Cl.
*B65D 81/38* (2006.01)
*E04B 1/74* (2006.01)
*F16L 41/00* (2006.01)

(52) U.S. Cl.
USPC .................. 312/401; 137/561 A; 52/404.1

(58) Field of Classification Search
USPC ............... 137/356, 357, 360, 374, 561 A; 52/404.1, 404.3; 312/400, 401, 406, 312/406.2
See application file for complete search history.

(56) References Cited

U.S. PATENT DOCUMENTS

| 2,263,070 | A | * | 11/1941 | Cusick | 52/742.13 |
| 2,439,602 | A | * | 4/1948 | Heritage | 52/742.11 |
| 3,132,382 | A | * | 5/1964 | Magester | 312/406 |
| 3,739,936 | A | * | 6/1973 | Jones, Jr. | 220/86.1 |
| 4,311,351 | A | | 1/1982 | Chang | |
| 4,707,401 | A | | 11/1987 | Benford | |
| 4,771,532 | A | | 9/1988 | Taylor, Jr. et al. | |
| 5,033,636 | A | | 7/1991 | Jenkins | |
| 5,061,019 | A | | 10/1991 | Kubota et al. | |
| 5,720,536 | A | | 2/1998 | Jenkins et al. | |
| 5,941,622 | A | * | 8/1999 | Davidson et al. | 312/400 |
| 6,058,968 | A | * | 5/2000 | Carter | 137/561 A |
| 6,311,744 | B1 | * | 11/2001 | Cary | 141/286 |
| 6,330,779 | B1 | * | 12/2001 | Kinzler | 52/742.13 |
| 7,182,417 | B2 | | 2/2007 | Taylor et al. | |

* cited by examiner

*Primary Examiner* — Eric Keasel
*Assistant Examiner* — Jonathan Waddy
(74) *Attorney, Agent, or Firm* — Dority & Manning, P.A.

(57) ABSTRACT

A manifold receives and distributes insulating foam to an interior of a consumer appliance case. The manifold includes an inlet attachable to a source of insulating foam exterior to the consumer appliance case, at least two outlets disposed at different locations within the consumer appliance case, an inlet passageway leading from the inlet further into the consumer appliance case interior, and at least two outlet passageways, each outlet passageway providing communication between the inlet passageway and a respective one of the outlets. Insulating foam received by the inlet is distributed to the interior of the consumer appliance case via the inlet passageway, outlet passageways and outlets. Related foamed-in case designs and methods of foaming-in a case are also disclosed.

19 Claims, 6 Drawing Sheets

# US 8,678,530 B2

FOAM MANIFOLD FOR INJECTION MOLDING CONSUMER APPLIANCE CASE, FOAMED-IN CASE, AND RELATED METHOD

FIELD OF THE INVENTION

The subject matter disclosed herein relates to a manifold for distributing foam used to insulate a consumer appliance case, a foamed-in case, and a related method of foaming-in a consumer appliance case.

BACKGROUND OF THE INVENTION

Foams such as polyurethane have been long used to insulate cabinets of consumer appliances such as refrigerators and freezers, water heaters, coolers, etc. Typically, these foams are introduced into a case structure of such a cabinet via a pour hole at or near the top of the case or a side of a case. The case structure is often made from an outer metal case and one or more inner liners made of pre-molded plastic. The foam is poured or injected in an amount taking less space than the void to be filled and then expands to fill the void within the case structure while the void is vented to let air escape during the filling and expansion. The expanded foam then hardens in place, providing a lightweight and effective insulation of the cabinet.

It can be difficult to fill a complex case structure completely and uniformly with foam. Typical foam insertion occurs from a single pour hole, from which the foam must expand to fill the case structure. In particular, newer case designs may call for more complex shapes and arrangements of parts such as ice makers and dispensers, shelving, drawers, filters, etc., within the fresh food and/or freezer compartments. Also, in some locations where conductivity is desired to be higher, the foam must be thinner, less dense, or simply absent. Accordingly, in several of such scenarios it can be an even greater challenge to fill the case structure with foam to a desired level.

Use of multiple pour holes in an attempt to better reach all locations within the case adds complexity to the fill process. As such, multiple external nozzles, foam and blowing agent supplies, connection points, and filling steps are required. Thus, attempting to fill a case using multiple pour holes undesirably multiplies costs and complexity, perhaps by a factor of the number of holes used.

Therefore, an improved foaming system and method that provide an even more reliable distribution of insulation foam and which was modifiable for various applications would be welcome.

BRIEF DESCRIPTION OF THE INVENTION

Aspects and advantages of the invention will be set forth in part in the following description, or may be obvious from the description, or may be learned through practice of the invention.

According to certain aspects of the disclosure, a manifold is disclosed for receiving and distributing insulating foam to an interior of a consumer appliance case. The manifold includes a manifold body mounted in the interior of the consumer appliance case having an inlet attachable to a source of insulating foam exterior to the consumer appliance case, at least two outlets disposed at different locations within the consumer appliance case, an inlet passageway leading from the inlet further into the consumer appliance case interior, and at least two outlet passageways, each outlet passageway providing communication between the inlet passageway and a respective one of the outlets. Insulating foam received by the inlet is distributed to the interior of the consumer appliance case via the inlet passageway, outlet passageways and outlets. Various options and modifications are possible.

According to certain other aspects of the disclosure, a consumer appliance includes a case having an outer case and an inner liner. A foam distribution manifold is mounted within the case between the outer case and the inner liner, the manifold having a manifold body with an inlet attachable to a source of insulating foam exterior to the case, at least two outlets disposed at different locations within the case, an inlet passageway leading from the inlet further into the case, and at least two outlet passageways, each outlet passageway providing communication between the inlet passageway and a respective one of the outlets. Insulating foam is disposed within the case between the outer case and inner liner, the foam surrounding the manifold body. Again, various options and modifications are possible.

According to certain other aspects of the invention, a method of forming a consumer appliance case includes attaching an outer case to an inner liner so as to leave a space therebetween; attaching a foam distribution manifold to one of the outer case or inner liner within the space, the manifold having a manifold body with an inlet attachable to a source of insulating foam exterior to the case, at least two outlets disposed at different locations within the case, an inlet passageway leading from the inlet further into the case, and at least two outlet passageways, each outlet passageway providing communication between the inlet passageway and a respective one of the outlets; and providing insulating foam to the space via the inlet, the inlet passageway, the outlet passageways and the outlets, the foam expanding within the space and at least partially surrounding the manifold body which remains in the space. As above, various options and modifications are possible.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
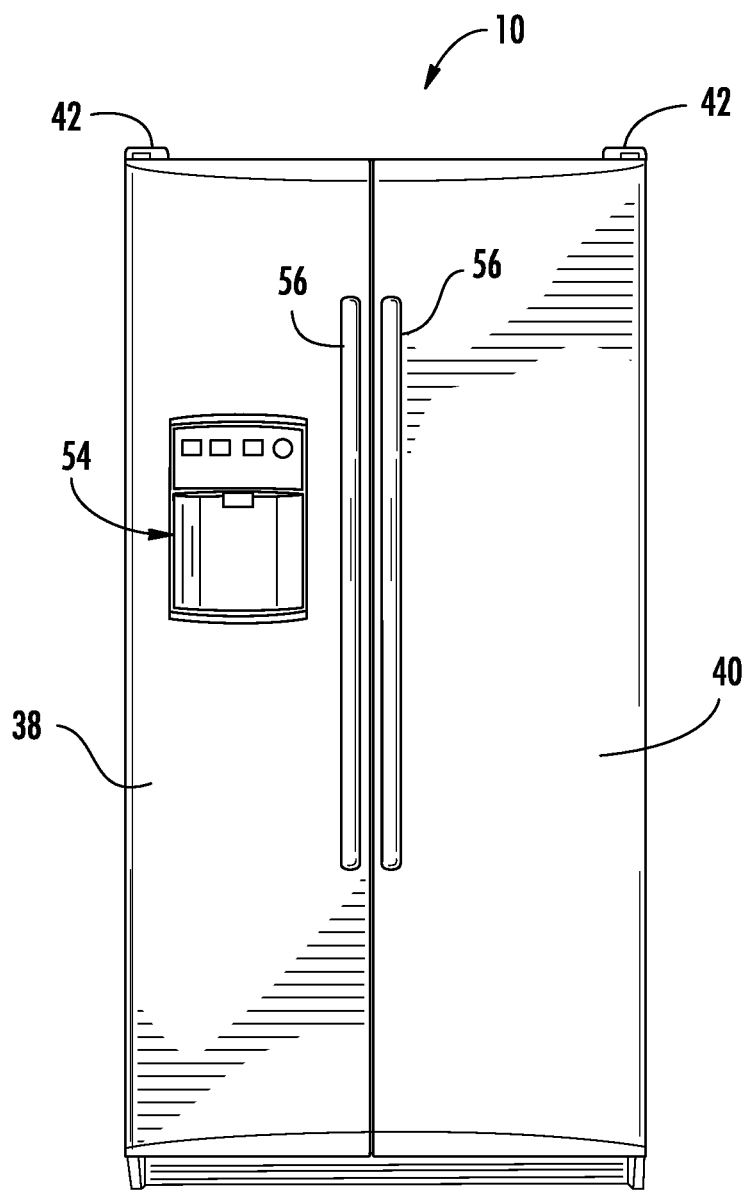
FIG. 1 provides a front view of a consumer appliance, in this case a refrigeration appliance, with its doors closed.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary consumer appliance, in this case a refrigeration appliance 10, depicted as a refrigerator in accordance with aspects of the present disclosure may be utilized. It should be appreciated that the consumer appliance of FIG. 1 is for illustrative purposes only and that the present disclosure is not limited to any particular type, style, or configuration of consumer appliance, such as a refrigeration appliance, a water heater, a cooler, or any other insulated appliance. Further, the example of the refrigeration appliance shown is not limiting, and such appliance may include any manner of refrigerator, freezer, refrigerator/freezer combination, and so forth.

Figure 2:
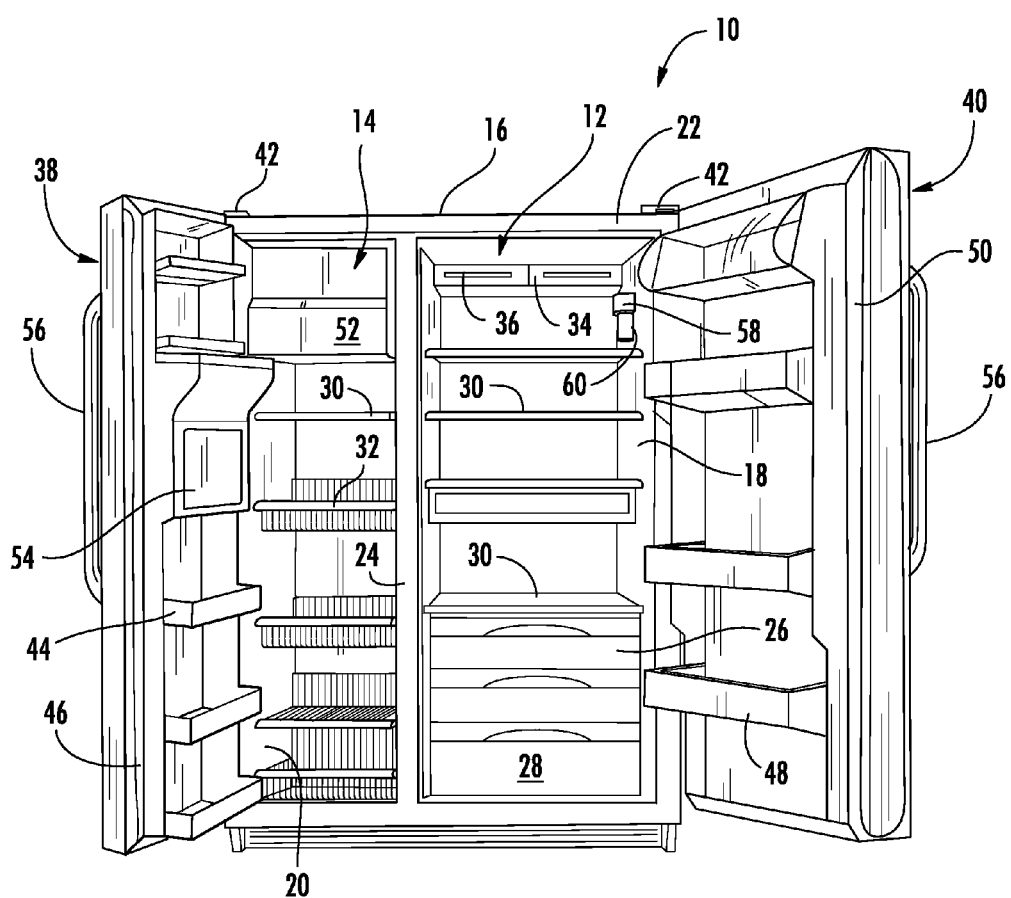
FIG. 2 provides a front view of the refrigeration appliance of FIG. 1 with its doors opened.

Referring to FIG. 2, the refrigerator 10 includes a fresh food storage compartment 12 and a freezer storage compartment 14, with the compartments arranged side-by-side and contained within an outer case 16 and inner liners 18 and 20 generally molded from a suitable plastic material. Foam insulation (not visible in FIG. 2) is located between outer case 16 and inner liners 18 and 20. In smaller refrigerators 10, a single liner is formed and a mullion spans between opposite sides of the liner to divide it into a freezer storage compartment and a fresh food storage compartment. The outer case 16 is normally formed by folding a sheet of a suitable material, such as pre-painted steel, into an inverted U-shape to form top and side walls of the outer case 16. A bottom wall of the outer case 16 normally is formed separately and attached to the case side walls and to a bottom frame that provides support for refrigerator 10.

A breaker strip 22 extends between a case front flange and outer front edges of inner liners 18 and 20. The breaker strip 22 is formed from a suitable resilient material, such as an extruded acrylo-butadiene-styrene based material (commonly referred to as ABS). The insulation in the space between inner liners 18 and 20 is covered by another strip of suitable resilient material, which also commonly is referred to as a mullion 24 and may be formed of an extruded ABS material. Breaker strip 22 and mullion 24 form a front face, and extend completely around inner peripheral edges of the outer case 16 and vertically between inner liners 18 and 20.

Slide-out drawers 26, a storage bin 28 and shelves 30 are normally provided in fresh food storage compartment 12 to support items being stored therein. In addition, at least one shelf 30 and at least one wire basket 32 are also provided in freezer storage compartment 14.

The refrigerator features are controlled by a controller 34 according to user preference via manipulation of a control interface 36 mounted in an upper region of fresh food storage compartment 12 and coupled to the controller 34. As used herein, the term "controller" is not limited to just those integrated circuits referred to in the art as microprocessor, but broadly refers to computers, processors, microcontrollers, microcomputers, programmable logic controllers, application specific integrated circuits, and other programmable circuits, and these terms are used interchangeably herein.

A freezer door 38 and a fresh food door 40 close access openings to freezer storage compartment 14 and fresh food storage compartment 12. Each door 38, 40 is mounted by a top hinge 42 and a bottom hinge (not shown) to rotate about its outer vertical edge between an open position, as shown in FIG. 1, and a closed position. The freezer door 38 may include a plurality of storage shelves 44 and a sealing gasket 46, and fresh food door 40 also includes a plurality of storage shelves 48 and a sealing gasket 50.

The freezer storage compartment 14 may include an automatic ice maker 52 and a dispenser 54 provided in the freezer door 38 such that ice and/or chilled water can be dispensed without opening the freezer door 38, as is well known in the art. Doors 38 and 40 may be opened by handles 56 is conventional. A housing 58 may hold a water filter 60 used to filter water for the ice maker 52 and/or dispenser 54.

As with known refrigerators, the refrigerator 10 also includes a machinery compartment (not shown) that at least partially contains components for executing a known vapor compression cycle for cooling air. The components include a compressor, a condenser, an expansion device, and an evaporator connected in series as a loop and charged with a refrigerant. The evaporator is a type of heat exchanger which transfers heat from air passing over the evaporator to the refrigerant flowing through the evaporator, thereby causing the refrigerant to vaporize. The cooled air is used to refrigerate one or more refrigerator or freezer compartments via fans. Also, a cooling loop can be added to direct cool the ice maker to form ice cubes, and a heating loop can be added to help remove ice from the ice maker. Collectively, the vapor compression cycle components in a refrigeration circuit, associated fans, and associated compartments are conventionally referred to as a sealed system. The construction and operation of the sealed system are well known to those skilled in the art.

FIGS. 3-10 show examples of foam distributing manifolds, consumer appliances foamed-in using manifolds, and the like, and illustrate methods of foaming-in using a manifold. In all such embodiments and examples, it should be understood that the disclosed manifold is provided so as be left in place within the case after foaming in, whereby a distribution of foam is achieved readily and inexpensively. Where relevant, like or similar reference numerals are employed on like or similar components below.

Figure 3:
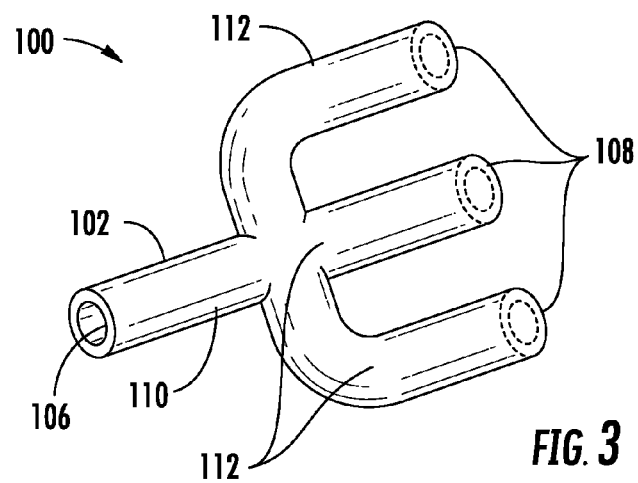
FIG. 3 provides a perspective view of a first example of a foam manifold.
Figure 4:
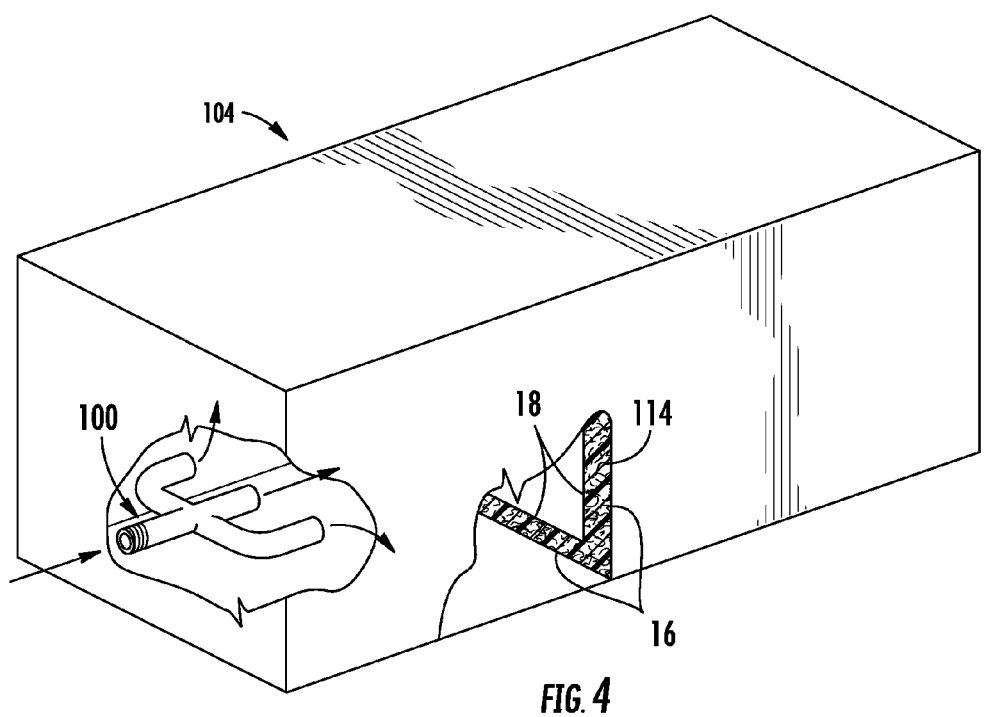
FIG. 4 provides a diagrammatical perspective view of the manifold as in FIG. 3 as attached to a refrigeration appliance case showing foam in the case.

In FIGS. 3 and 4 a first example of a foam distribution manifold 100 is depicted. As shown, manifold 100 includes a manifold body 102 that can be mounted in the interior of a consumer appliance case 104, which may for example be between inner liner 18 and outer case 16 of refrigerator 10 or other appliance as mentioned above. Manifold 100 has an inlet 106 attachable to a source of insulating foam exterior to the appliance case 104. At least two (in this case three) outlets 108 are disposed at different locations within appliance case 104. An inlet passageway 110 leads from inlet 106 further into the interior of appliance case 104. At least two (in this case three) outlet passageways 112 provide communication between inlet passageway 110 and a respective one of the outlets 108. When insulating foam is injected into inlet 106 the foam 114 is distributed to the interior of the appliance case 104 via the inlet passageway 110, outlet passageways 112 and outlets 108.

As shown, inlet passageway 110 and the outlet passageways 112 are tube shaped, although other shapes are possible. Three outlet passageways 112 are shown, but any number could be used with varying shapes, cross-sections, etc. as desired for a particular application. Cross sectional shape could vary along the passageways or remain constant, or change from one passageway to another to "fine tune" and direct flow as desired in a particular appliance. Passageways need not all branch from the same location. Thus, larger trunk passageways may branch to further downstream passageways, which may be smaller in cross-sectional diameter if desired, to further fine tune and control flow.

FIG. 4 shows generally the location of manifold 100 as used with case 104. It should be understood that any such location could be used depending on the geometry of case 104, the spacing between liners 18,20 and outer case 16, etc. Generally, manifold 100 is held within case 104 by some structure, and can remain in place after foaming-in. Thus, in appliance case 104, insulating foam is disposed within the case between the outer case 16 and inner liner 18, the foam surrounding the manifold body when it hardens.

Figure 5:
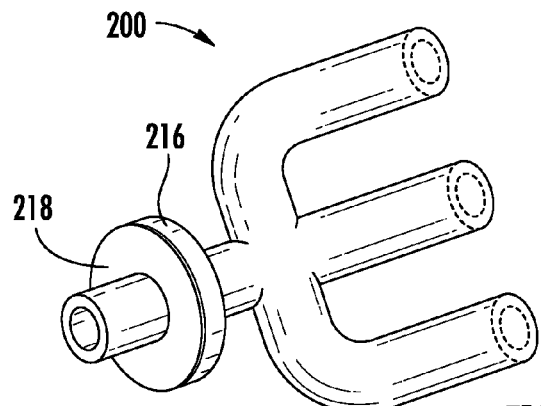
FIG. 5 shows a perspective view of an alternate foam manifold with a mounting flange.

FIG. 5 shows a modified version of manifold 200 with attachment structure, in particular a flange 216 provided for mounting to an opening (not shown) in outer case 16. If desired, flange may be attached directly to an inside of outer case 16 by adhesive layer 218. Layer 218 may comprise a tape, an adhesive, an epoxy, or other such material for attaching flange 216 to inside of outer case 16.

Figure 6:
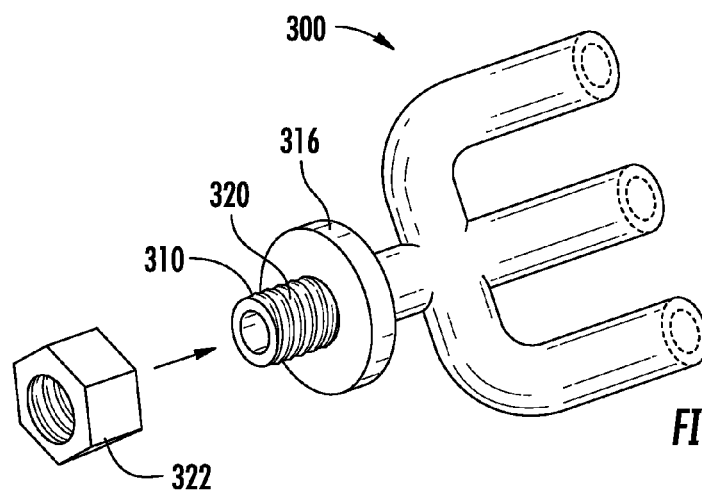
FIG. 6 shows a perspective view of another alternate foam manifold with a threaded attachment.

FIG. 6 shows another modification to manifold 300, wherein inlet passageway 310 includes threading 320 distal of flange 316. Threading 320 may screw directly into an opening (not shown) in outer case 16 or may mate with a threaded member 322 attached to an outer surface of outer case 16 to hold manifold 300 in place.

Figure 7:
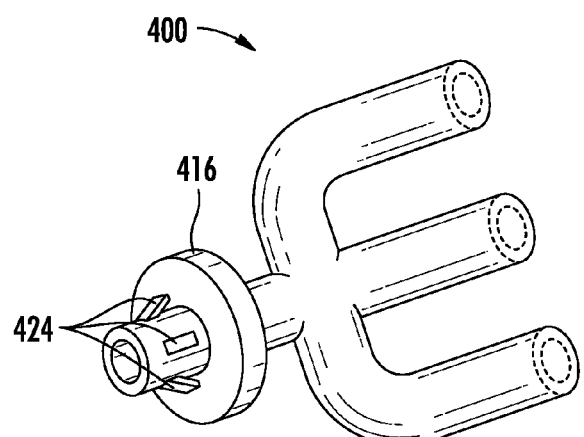
FIG. 7 shows a perspective view of another alternate foam manifold with snap-in connectors.

FIG. 7 shows another example wherein manifold 400 includes snap-in elements 424 distal of flange 416 for securement within corresponding openings (not shown) within outer case. Such snap-in structure allows manifold 400 to be simply slid into place until snapped in. It should therefore be understood that various structures could be used to attach manifold to outer case 16 within the scope of the present invention, including modifications of the above or combinations of the above.

Figure 8:
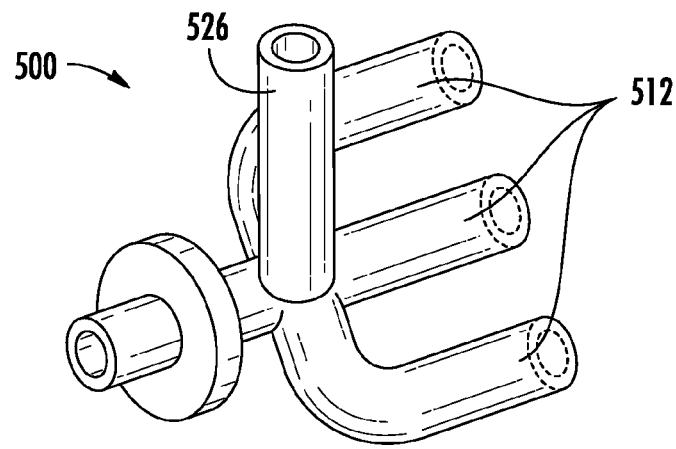
FIG. 8 shows a perspective view of another alternate foam manifold with a vertical component.

FIG. 8 shows another manifold 500 where three substantially horizontal outlet passageways 512 and one substantially vertical outlet passageway 526 are provided. It should therefore be understood that differences in height can be used with the manifolds to distribute foam to different parts of a single compartment or even different compartments within case 104.

Figure 9:
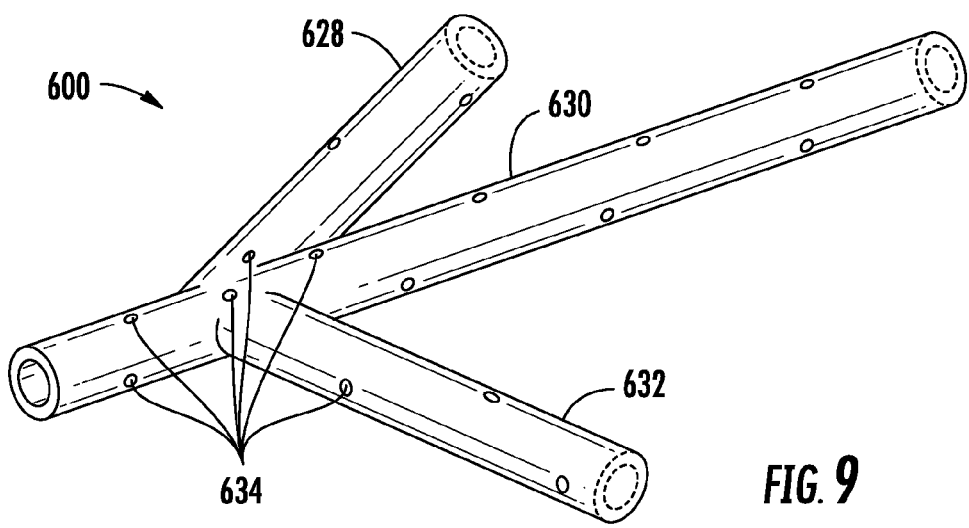
FIG. 9 shows a perspective view of another alternate foam manifold with multiple openings along its length.

FIG. 9 shows another manifold 600 with outlet passageway arms 628, 630, 632 of differing lengths. Also, openings 634 are provided though manifold 600 allowing foam to flow outward at various locations. The length of the various passageways can be modified, and the size, size distribution and/or locations of the openings can be selected to fine tune placement of foam within case 104.

Figure 10:
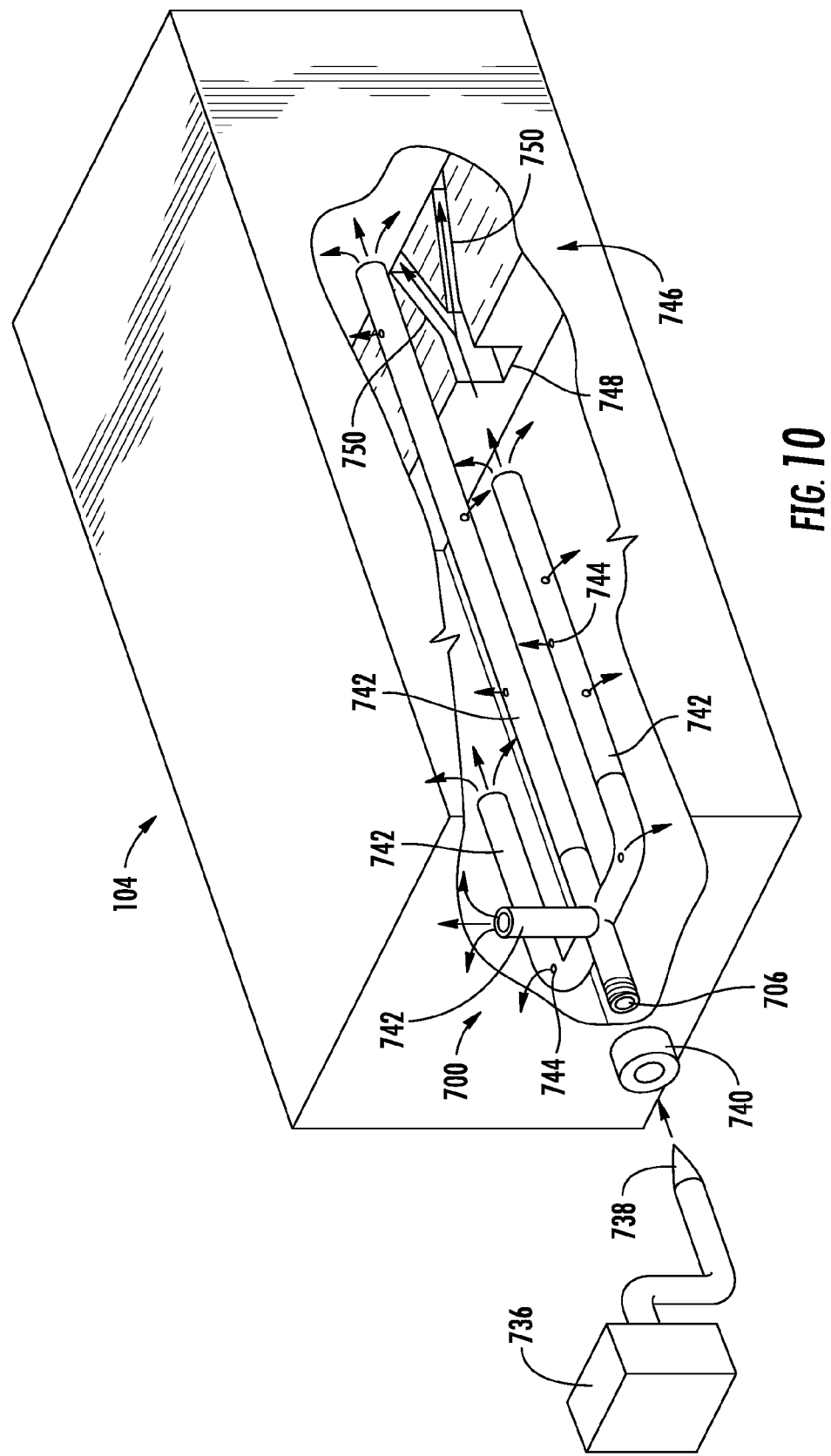
FIG. 10 shows a perspective view of another alternate foam manifold in a refrigeration appliance case with extension tubes attached.

FIG. 10 shows another manifold 700 incorporating features of several of the above manifolds. A diagrammatic representation of foam supply 736 supplies foam under pressure to nozzle 738, which can be attached to manifold inlet opening 706 via a threaded fitting 740. Distribution tubes 742 are attached to manifold 700 to carry foam further into case 104 before being released. The tubes and manifold may have openings 744 in them to distribute some foam along the way.

A flow control and dividing channel 746 is illustrated as well. Such channel structure may comprise an addition to the manifold or a replacement whereby the branched structure comprises the manifold itself. As shown, channel 746 includes an inlet channel 748 and two outlet channels 750 both receiving divided flow from the inlet channel. As a supplement to or replacement for the purely tubular manifold structures above, such channeling structure can be used to distribute foam internally within case 104.

Regarding materials, the inner liners 18 and 20 may be formed of vacuum formed plastic such as ABS (acrylonitrile butadiene styrene) or others. The outer case 16 may be formed of sheet metal for strength and rigidity. The foam may be a urethane, polyurethane, etc. The manifold and extension tubes can be made of a thin plastic such as polyethylene or the like so as to be inexpensive and light. Also, configuration and heat transfer properties of the manifold and extension tubes can be selected so as to not provide excessive heat sink function within the foam that would interfere with the thermal protection provided by the foam.

It should be understood that various options, modifications, and combinations of the above structures can be employed. Typically, the structure of the consumer/refrigeration appliance may dictate to a great deal the number, orientation, extension, etc. of outlets on the manifold, openings, extension tubes, deflection channels, etc. Thus, using the above disclosure, as skilled artisan can construct a manifold and optional modifications, attachments etc, to suit a particular application According to other aspects of the disclosure, a method of forming a consumer appliance case includes attaching an outer case 16 to an inner liner 18 so as to leave a space therebetween. A foam distribution manifold 100, 200, etc. is attached to one of the outer case or inner liner within the space, the manifold having a manifold body with an inlet attachable to a source of insulating foam exterior to the case, at least two outlets disposed at different locations within the case, an inlet passageway leading from the inlet further into the case, and at least two outlet passageways, each outlet passageway providing communication between the inlet passageway and a respective one of the outlets. For information on the manifold design or attachment, please see the descriptions of the manifolds and variations above. The method also includes providing insulating foam 114 to the space via the inlet, the inlet passageway, the outlet passageways and the outlets, for example via a foam supply 736 and nozzle 738. Foam 114 expands within the space and at least partially surrounds the manifold body which remains in the space. If desired, the attaching step may further includes attaching distribution tubes 742 to at least one of the outlets to direct foam further from the manifold body.

In view of the above, a manifold for distributing foam used to insulate a consumer appliance case, a foamed-in case, and a related method of foaming-in a consumer appliance case are provided. The structures and methods allow for an efficient and cost effective foaming-in of a consumer appliance case, with possible modification to meet many particular applications following the teachings above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A consumer appliance comprising:
a consumer appliance case including an outer case and an inner liner, an interior of the consumer appliance case defined between the outer case and the inner liner;
a rigid tubular manifold body mounted in the interior of the consumer appliance case having an inlet attachable to a source of insulating foam exterior to the consumer appliance case, at least two outlets disposed at different locations within the consumer appliance case, an inlet passageway leading from the inlet further into the interior of the consumer appliance case, an inlet passageway leading from the inlet further into the interior of the consumer appliance case, and at least two outlet passageways, each outlet passageway providing communication between the inlet passageway and a respective one of the outlets, whereby insulating foam received by the inlet is distributed to the interior of the consumer appliance case via the inlet passageway, outlet passages and outlets; and
insulating foam disposed within the consumer appliance case between the outer case and the inner liner, the foam surrounding the rigid tubular manifold body within the interior of the consumer appliance case.

2. The consumer appliance of claim 1, wherein the inlet passageway and the outlet passageways are tube shaped.

3. The consumer appliance of claim 1, wherein the rigid tubular manifold body includes at least four outlets and outlet passageways.

4. The consumer appliance of claim 1, wherein at least one distribution tube is attached to at least one of the outlets to distribute foam away from the rigid tubular manifold body.

5. The consumer appliance of claim 1, further comprising flow diverters located on at least one of the outer case or the inner liner of the consumer appliance case.

6. The consumer appliance of claim 1, wherein the rigid tubular manifold body comprises a plastic.

7. The consumer appliance of claim 6, wherein the rigid tubular manifold body comprises polyethylene.

8. A consumer appliance comprising:
a case including an outer case and an inner liner;
a foam distribution manifold mounted within the case between the outer case and the inner liner, the manifold having a rigid tubular manifold body with an inlet attachable to a source of insulating foam exterior to the case, at least two outlets disposed at different locations within the case, an inlet passageway leading from the inlet further into the case, and at least two outlet passageways, each outlet passageway providing communication between the inlet passageway and a respective one of the outlets; and
insulating foam disposed within the case between the outer case and inner liner, the foam surrounding the rigid tubular manifold body.

9. The consumer appliance of claim 8, wherein the inlet passageway and the outlet passageways are tube shaped.

10. The consumer appliance of claim 8, wherein the rigid tubular manifold body includes at least four outlets and outlet passageways.

11. The consumer appliance of claim 8, wherein at least one distribution tube is attached to at least one of the outlets to distribute foam away from the rigid tubular manifold body.

12. The consumer appliance of claim 8, further comprising flow diverters located on at least one of the outer case or the inner liner of the consumer appliance case.

13. The consumer appliance of claim 8, wherein the rigid tubular manifold body comprises a plastic.

14. The consumer appliance of claim 13, wherein the rigid tubular manifold body comprises polyethylene.

15. A method of forming a consumer appliance case comprising:
attaching an outer case to an inner liner so as to leave a space therebetween;
attaching a foam distribution manifold to one of the outer case or inner liner within the space, the manifold having a rigid tubular manifold body with an inlet attachable to a source of insulating foam exterior to the case, at least two outlets disposed at different locations within the case, an inlet passageway leading from the inlet further into the case, and at least two outlet passageways, each outlet passageway providing, communication between the inlet passageway and a respective one of the outlets; and
providing insulating foam to the space via the inlet, the inlet passageway, the outlet passageways and the outlets, the foam expanding within the space and at least partially surrounding the rigid tubular manifold body which remains in the space.

16. The method of claim 15, wherein the attaching step further includes attaching distribution tubes to at least one of the outlets to direct foam further from the rigid tubular manifold body.

17. The method of claim 15, wherein the rigid tubular manifold body includes at least four outlets and outlet passageways.

18. The method of claim 15, wherein the rigid tubular manifold body comprises a plastic.

19. The method of claim 15, wherein the rigid tubular manifold body comprises polyethylene.

* * * * *